July 21, 1942.  D. SLOTSKY  2,290,389

FASTENING MEANS FOR RIMLESS GLASSES

Filed May 17, 1940

Patented July 21, 1942

2,290,389

UNITED STATES PATENT OFFICE 2,290,389

FASTENING MEANS FOR RIMLESS GLASSES

David Slotsky, Cleveland, Ohio

Application May 17, 1940, Serial No. 335,689

6 Claims. (Cl. 88—47)

My invention relates in general to eye glasses or spectacles and more specifically to a fastening means for rimless glasses.

An object of my invention is to provide an improved fastening means for spectacles which prevents strain from being transmitted to the lenses.

Another object of my invention is to provide a fastening means for eye glasses which will be substantially inconspicuous in appearance.

Another object of my invention is the provision of lens-edge members to which the lenses may be mounted.

Another object of my invention is the provision of a "box beam lens" mounting interconnected by a "single beam" nasal bridge element.

Another object of my invention is the provision of utilizing the lens as a part of the "box beam lens" mounting.

Another object of my invention is the provision of utilizing the lens and a lens-edge member spaced therefrom and connected thereto at spaced locations as the construction for my "box beam lens" mounting.

Another object of my invention is the provision of mounting the lenses to the metal parts, in which the lenses do not support anything but themselves.

Another object of my invention is the provision of fastening means for spectacles which causes whatever strain that may be transmitted to the lenses to be directed inwardly rather than outwardly.

Another object of my invention is the provision of spaced fastening means for connecting the lenses of a spectacle to the metal parts in which the spaced fastening means are constrained toward each other and thus relieve the marginal edges of the lenses from strain and breakage.

Another object of my invention is the provision of fastening means for a spectacle in which the lenses may be readily and easily removable.

Another object of my invention is to provide for resiliently constraining the spaced fastening means of a spectacle by means of a lens-edge resilient member.

Another object of my invention is the provision of mounting the lenses of a spectacle to the metal parts at two spaced locations in which the two spaced locations are connected together by a resilient member.

Other objects and a fuller understanding of my invention may be had by referring to the following description and claims, taken in conjunction with the accompanying drawing, in which:

Figure 5 is a modified form of a fastening means as shown in Figure 4.

Figure 4:
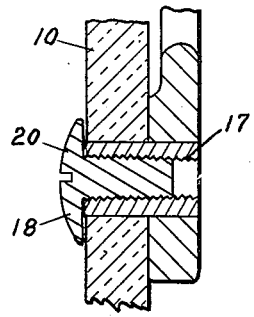
Figure 4 is a cross-sectional view of a fastening means taken along the line 4—4 of Figure 1.

With reference to the drawing, my invention comprises a pair of lenses 10, nasal strap engaging means 11, temple strap engaging means 12, a nasal bridge element 13 for connecting the nasal straps, temple members 14 pivotally connected at 15 to the temple straps 12, and lens-edge members 16 interconnecting the nasal straps and the temple straps. Any suitable means may be employed to connect the nasal straps 11 and the temple straps 12 to the lenses 10. As illustrated in Figure 4, I employ a tube and screw arrangement which comprises a hollow threaded tube 17 suitably connected to the straps and a screw 18 threadably fitting therein. In this embodiment of the invention, the tubes may be permanently connected to the straps such as by soldering or otherwise fastening them into holes in the straps. The threaded screw 18 having an enlarged head 20 is adapted to threadably engage the female threads of the tube 17 and the enlarged head 20 thereof engages the tube for freely holding the glass to the straps, without strain on the glass (see microscopic clearance in the drawing).

Figure 1:
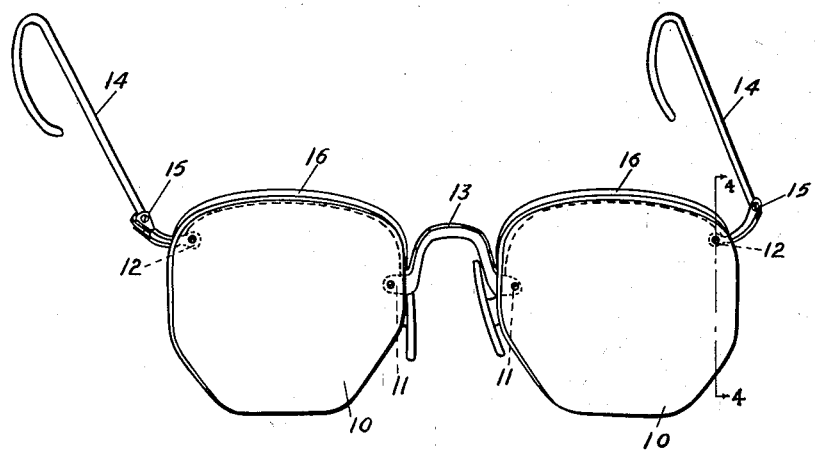
Figure 1 represents a front perspective view of a pair of spectacles embodying the features of my invention.
Figure 2:
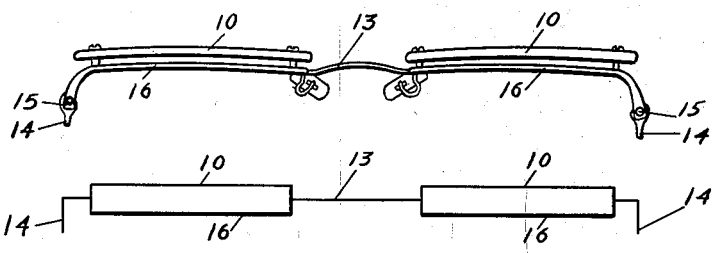
Figure 2 is a view looking downwardly upon the spectacles.
Figure 3:
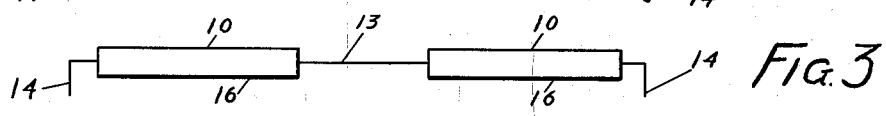
Figure 3 is a schematic structural diagram of my spectacles.

The lens-edge members 16 follow closely the contour of the upper edge of the lens to make the appearance as inconspicuous as possible. As shown in Figure 2, the lens-edge members 16 are spaced from the lenses and thus the combination of the lenses, the lens-edge members and the two spaced mounting means for the straps constitute what I call a "box beam lens" mounting interconnected by a "single beam" nasal bridge element, which is schematically illustrated in the structural diagram in Figure 3. The spacing of the lens-edge members 16 from the lenses gives in effect a deeper mounting and thus produces more strength and rigidity. The lenses act as a part of the "box beam lens" mounting, and the resiliency of the spectacle takes place in the nasal bridge element; that is, in the "single beam" element. Because of the cooperation between the lenses and the lens-edge members, no harmful strains are transmitted to the lenses. The lenses and the lens-edge members contribute to each other to lessen the strain. The lenses do not support anything but themselves. The length of the lens-edge members 16 may be such that the mounting means for the straps align themselves with the holes in the lenses without constraint or distortion. As an alternative, the lens-edge mounting members 16 may be resilient and formed when unconstrained to be shorter than the spacing between the nasal and temple holes of the lenses so that when the mounting means are fastened in the holes of the lenses, there is produced a resilient force inwardly of the lenses rather than outwardly which would tend to crack or chip the lenses between the marginal edge and the holes. That is to say, the resilient force of the lens-edge members tends to draw or force the mounting means for the straps toward each other. The amount of the inward tension produced by the lens-edge resilient members may be sufficient to ordinarily counter-balance any strain which may be transmitted to the lenses from the temples 14 and the nose or nasal bridge element 13. Therefore, by making the resiliency of the lens-edge member of a sufficient value substantially no strain whatsoever is exerted outwardly from the small holes in the lens to break the edges thereof.

In Figure 5 I show a modified form of the fastening means and comprising a hollow threaded tube 27 extending through an opening 29 in the strap and the lens 10 and a screw 28 which is arranged to threadably engage the internal threads of the hollow tube 27 and freely hold the lens to the strap, without strain on the glass.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a spectacle construction having a lens with a nasal small perforated opening near the nasal edge thereof and a temple small perforated opening near the temple edge thereof, a lens-edge resilient member following closely the contour of the upper edge of the lens and extending between the small openings of the lens, two small hollow tubes connected at spaced locations to the lens-edge resilient member, one of said hollow tubes being connected to the lens-edge resilient member near the nasal opening of the lens and being adapted to fit thereinto and the other hollow tube being connected to the lens-edge resilient member near the temple opening of the lens and being adapted to fit thereinto, each of said small hollow tubes having internal threads therein, and screw means threadably engaging the internal threads in each of the hollow tubes and securing the lens to the lens-edge resilient member, said lens-edge resilient member urging the hollow tubes toward each other inwardly of the lens.

2. In a spectacle construction having a lens with a nasal small perforated opening near the nasal edge thereof and a temple small perforated opening near the temple edge thereof, a lens-edge member following closely the contour of the upper edge of the lens and extending between the small openings of the lens, two small post members connected at spaced locations to the lens-edge member, one of said post members being connected to the lens-edge member near the nasal opening of the lens and being adapted to fit thereinto and the other post member being connected to the lens-edge member near the temple opening of the lens and being adapted to fit thereinto, and securing means engaging each of the post members to secure the lens to the lens-edge member, each said post member being slightly longer than the thickness of the lens and each said securing means abutting the end of the post member to give a slight clearance between the lens and the securing means.

3. In a spectacle construction having a lens with a nasal small perforated opening near the nasal edge thereof and a temple small perforated opening near the temple edge thereof, a lens-edge resilient member following closely the contour of the upper edge of the lens and extending between the small openings of the lens, two small post members connected at spaced locations to the lens-edge member, one of said post members being connected to the lens-edge member near the nasal opening of the lens and being adapted to fit thereinto and the other post member being connected to the lens-edge member near the temple opening of the lens and being adapted to fit thereinto, and securing means engaging each of the post members to secure the lens to the lens-edge member, each said post member being slightly longer than the thickness of the lens and each said securing means abutting the end of the post member to give a slight clearance between the lens and the securing means, said lens-edge resilient member urging the post members toward each other inwardly of the lens.

4. In a spectacle construction for a lens with a nasal small perforated opening near the nasal edge thereof and a temple small perforated opening near the temple edge thereof, said construction including a temple piece and a nasal bridge piece, the improvement of a mounting for the lens comprising, in combination, nasal mounting means including a fixedly mounted small post member adapted to closely fit into the nasal perforated opening of the lens, said nasal mounting means including an anchoring portion to which the nasal bridge piece is mounted and a bearing portion to which the nasal post member is mounted and against which the lens bears, temple mounting means including a fixedly mounted small post member adapted to closely fit into the temple perforated opening of the lens, said temple mounting means including an anchoring portion to which the temple piece is mounted and a bearing portion to which the temple post member is mounted and against which the lens bears, a lens-edge member on the rearward side of the lens following closely the contour thereof and interconnecting the nasal and temple mounting means, said lens-edge member being spaced from the lens and having a nasal end terminating at the nasal mounting means and having a temple end terminating at the temple mounting means, said nasal end of the lens-edge member joining the nasal mounting means at a place located between the said bearing portion and the said anchoring portion and forming a three branch juncture with the nasal small post member spaced inwardly of the lens from the said juncture, said temple end of the lens-edge member joining the temple mounting means at a place located between the said bearing portion and the said anchoring portion and forming a three branch juncture with the temple small post member spaced inwardly of the lens from the said juncture, said post members projecting forwardly from said junctures and extending substantially perpendicular to the plane of the lens to readily facilitate the easy mounting of the post members into the openings of the lens without interference from the lens-edge member, said post members extending beyond the general plane of the mounting a sufficient distance to protrude into and engage the internal surface of the perforated openings, whereby the lens is secured against lateral displacement by the fixedly mounted small post members fitting closely in the openings of the lens with the lens bearing against said bearing portions, each of said post members having an internal hole, and securing means including head means and an extension means engaging the internal hole in each of the post members to cause the head means to hold the lens between said head means and the bearing portions of the mounting means.

5. In a spectacle construction for a lens with a nasal small perforated opening near the nasal edge thereof and a temple small perforated opening near the temple edge thereof, said construction including a temple piece and a nasal bridge piece, the improvement of a mounting for the lens comprising, in combination, nasal mounting means including a fixedly mounted small post member adapted to closely fit into the nasal perforated openings of the lens, said nasal mounting means including an anchoring portion to which the nasal bridge piece is mounted and a bearing portion to which the nasal post member is mounted and against which the lens bears, temple mounting means including a fixedly mounted small post member adapted to closely fit into the temple perforated opening of the lens, said temple mounting means including an anchoring portion to which the temple piece is mounted and a bearing portion to which the temple post member is mounted and against which the lens bears, a lens-edge member on the rearward side of the lens following closely the contour thereof and interconnecting the nasal and temple mounting means, said lens-edge member being spaced from the lens and having a nasal end terminating at the nasal mounting means and having a temple end terminating at the temple mounting means, said nasal end of the lens-edge member joining the nasal mounting means at a place located between the said bearing portion and the said anchoring portion and forming a three branch juncture with the nasal small post member spaced inwardly of the lens from the said juncture, said temple end of the lens-edge member joining the temple mounting means at a place located between the said bearing portion and the said anchoring portion and forming a three branch juncture with the temple small post member spaced inwardly of the lens from the said juncture, said post members projecting forwardly from said junctures and extending substantially perpendicular to the plane of the lens to readily facilitate the easy mounting of the post members into the openings of the lens without interference from the lens-edge member, said post members extending beyond the general plane of the mounting a sufficient distance to protrude into and engage the internal surface of the perforated openings, whereby the lens is secured against lateral displacement by the fixedly mounted small post members fitting closely in the openings of the lens with the lens bearing against said bearing portions, each of said post members having internal threads therein, and securing means including head means and screw means threadably engaging the internal threads in each of the post members to cause the head means to hold the lens between said head means and the bearing portions of the mounting means.

6. In a spectacle construction for a lens with a nasal small perforated opening near the nasal edge thereof and a temple small perforated opening near the temple edge thereof, said construction including a temple piece and a nasal bridge piece, the improvement of a mounting for the lens comprising, in combination, nasal mounting means including a fixedly mounted small post member adapted to closely fit into the nasal perforated opening of the lens, said nasal mounting means including an anchoring portion to which the nasal bridge piece is mounted and a bearing portion to which the nasal post member is mounted and against which the lens bears, temple mounting means including a fixedly mounted small post member adapted to closely fit into the temple perforated opening of the lens, said temple mounting means including an anchoring portion to which the temple piece is mounted and a bearing portion to which the temple post member is mounted and against which the lens bears, a lens-edge member on the rearward side of the lens following closely the contour thereof and interconnecting the nasal and temple mounting means, said lens-edge member being spaced from the lens and having a nasal end terminating at the nasal mounting means and having a temple end terminating at the temple mounting means, said nasal end of the lens-edge member joining the nasal mounting means at a place located between the said bearing portion and the said anchoring portion and forming a three branch juncture with the nasal small post member spaced inwardly of the lens from the said juncture, said temple end of the lens-edge member joining the temple mounting means at a place located between the said bearing portion and the said anchoring portion and forming a three branch juncture with the temple small post member spaced inwardly of the lens from the said juncture, said post members projecting forwardly from said junctures and extending substantially perpendicular to the plane of the lens to readily facilitate the easy mounting of the post members into the openings of the lens without interference from the lens-edge member, said post members extending beyond the general plane of the mounting a sufficient distance to protrude into and engage the internal surface of the perforated openings, where by the lens is secured against lateral displacement by the fixedly mounted small post members fitting closely in the openings of the lens with the lens bearing against said bearing portions, each said bearing portion including the small post member connected thereto having a threaded opening extending therethrough, and securing means including head means and screw means threadably engaging each of said threaded openings to cause the head means to hold the lens between said head means and the bearing portions of the mounting means.

DAVID SLOTSKY.